(12) United States Patent
Hamadate et al.

(10) Patent No.: US 12,055,328 B2
(45) Date of Patent: Aug. 6, 2024

(54) REFRIGERATION APPARATUS AND REFRIGERANT PIPE OF THE SAME REFRIGERATION APPARATUS

(71) Applicant: DAIKIN INDUSTRIES, LTD., Osaka (JP)

(72) Inventors: Junichi Hamadate, Osaka (JP); Masanori Jindou, Osaka (JP); Yoshihiro Teramoto, Osaka (JP); Hiroaki Matsuda, Osaka (JP); Masato Okuno, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 172 days.

(21) Appl. No.: 17/584,893

(22) Filed: Jan. 26, 2022

(65) Prior Publication Data
US 2022/0146161 A1    May 12, 2022

Related U.S. Application Data

(63) Continuation of application No. PCT/JP2020/020502, filed on May 25, 2020.

(30) Foreign Application Priority Data

Jul. 31, 2019   (JP) ................................. 2019-141770
Dec. 25, 2019   (JP) ................................. 2019-234277

(51) Int. Cl.
*F16L 41/08*     (2006.01)
*F25B 41/40*     (2021.01)

(52) U.S. Cl.
CPC ............ *F25B 41/40* (2021.01); *F16L 41/084* (2013.01); *F16L 41/082* (2013.01)

(58) Field of Classification Search
CPC ....... F16L 41/084; F16L 41/082; F16L 13/02; F16L 13/007; F16L 13/0236; F16L 13/0227; F25B 41/40
See application file for complete search history.

(56) References Cited

U.S. PATENT DOCUMENTS 1,941,465 A * 1/1934 Cornell, Jr. ........... F16L 41/084
2,249,469 A * 7/1941 Gray ..................... F16L 41/084
(Continued)

FOREIGN PATENT DOCUMENTS

CN        201191112 Y    2/2009
CN        102853513 A    1/2013
(Continued)

OTHER PUBLICATIONS

CN-102962633-B—Machine Translation—English (Year: 2015).*
(Continued)

*Primary Examiner* — William S. Choi
(74) *Attorney, Agent, or Firm* — Osha Bergman Watanabe & Burton LLP

(57) ABSTRACT

A refrigerant pipe of a refrigeration apparatus includes: a first pipe, made of stainless steel, through which a refrigerant flows; a joint pipe, made of a material different from stainless steel, disposed on an outer peripheral surface of the first pipe; and a second pipe, having a diameter smaller than a diameter of the first pipe, connected to the outer peripheral surface of the first pipe via the joint pipe. A surface of the second pipe at which the second pipe is connected to the joint pipe is made of a material identical to the material of the joint pipe.

8 Claims, 14 Drawing Sheets

(56) References Cited

U.S. PATENT DOCUMENTS

| | | | |
|---|---|---|---|
| 3,971,500 A * | 7/1976 | Kushner | |
| 4,212,931 A * | 7/1980 | Cadart | F16L 41/084 |
| 5,228,727 A * | 7/1993 | Tokutake | F16L 41/084 |
| 6,223,549 B1 | 5/2001 | Kasai | |
| 2011/0017319 A1 | 1/2011 | Zhang et al. | |
| 2018/0259226 A1 | 9/2018 | Hong | |

FOREIGN PATENT DOCUMENTS

| | | |
|---|---|---|
| CN | 102873508 A | 1/2013 |
| CN | 203036155 U | 7/2013 |
| CN | 203869386 U | 10/2014 |
| CN | 102962633 B * | 9/2015 |
| CN | 205001726 U | 1/2016 |
| CN | 205781506 U | 12/2016 |
| CN | 206889747 U | 1/2018 |
| CN | 109954996 A * | 7/2019 |
| EP | 1684033 A1 | 7/2006 |
| JP | S52-009860 U | 1/1977 |
| JP | S53-060836 A | 5/1978 |
| JP | H05-094593 U | 12/1993 |
| JP | 2000-009368 A | 1/2000 |
| JP | 2005-121131 A | 5/2005 |
| JP | 2009-109122 A | 5/2009 |
| JP | 2010-091202 A | 4/2010 |
| JP | 2010-151327 A | 7/2010 |
| JP | 2016-001097 A | 1/2016 |
| JP | 5927414 B2 | 6/2016 |
| JP | 2016-130594 A | 7/2016 |
| JP | 2017-137961 A | 8/2017 |
| JP | 2018-141448 A | 9/2018 |
| JP | 2019-124402 A | 7/2019 |
| KR | 101837909 B1 | 3/2018 |

OTHER PUBLICATIONS

CN-109954996-A—Machine Translation—English (Year: 2019).*
International Preliminary Report on Patentability issued in corresponding International Application No. PCT/JP2020/020502, mailed on Feb. 10, 2022 (5 pages).
International Preliminary Report on Patentability issued in corresponding International Application No. PCT/JP2020/022332, mailed on Feb. 10, 2022 (6 pages).
Extended European Search Report issued in corresponding European Patent Application No. 20847177.1, dated Aug. 2, 2022 (9 pages).
Extended European Search Report issued in related European Patent Application No. 20847598.8, dated Aug. 16, 2022 (8 pages).
International Search Report issued in corresponding International Application No. PCT/JP2020/020502, mailed on Aug. 11, 2020 (6 pages).
International Search Report issued in related International Application No. PCT/JP2020/022332, mailed on Aug. 25, 2020 (6 pages).

* cited by examiner

REFRIGERATION APPARATUS AND REFRIGERANT PIPE OF THE SAME REFRIGERATION APPARATUS

TECHNICAL FIELD

The present disclosure relates to a refrigeration apparatus and a refrigerant pipe of the refrigeration apparatus.

BACKGROUND

Conventionally, a copper pipe is often used as a refrigerant pipe in a refrigeration apparatus of such as an air conditioner or an air conditioning system. Further, copper is often used for a thin tube to which a service port, a pressure sensor, and the like are connected. The connection between the thin tube and the refrigerant pipe communicating with the thin tube has been performed by manual brazing.

While a copper pipe has an advantage of being relatively easy to process, the material cost of the copper pipe is high, and thus, it is conceivable to use a refrigerant pipe made of stainless steel which is relatively inexpensive (see, for example, Patent Literature 1).

PATENT LITERATURE

Patent Literature 1: JP 2010-151327 A

SUMMARY

A refrigerant pipe of a refrigeration apparatus (hereinafter, also simply referred to as "refrigerant pipe") according to the present disclosure includes:

a first pipe made of stainless steel through which a refrigerant flows;

a joint pipe provided on an outer peripheral surface of the first pipe and made of a material different from stainless steel; and a second pipe having a diameter smaller than that of the first pipe and connected to the outer peripheral surface of the first pipe via the joint pipe, wherein a surface to be connected, which is connected to the joint pipe, of the second pipe is made of an identical material to the material of the joint pipe.

DETAILED DESCRIPTION

Hereinafter, a refrigeration apparatus and a refrigerant pipe of the refrigeration apparatus according to the present disclosure will be described in detail with reference to the accompanying drawings. The present disclosure is not limited to the following exemplary description, and all changes that fall within metes and bounds of the claims, or equivalence such metes and bounds thereof are therefore intended to be embraced by the claims.

[Air Conditioner A]

Figure 1:
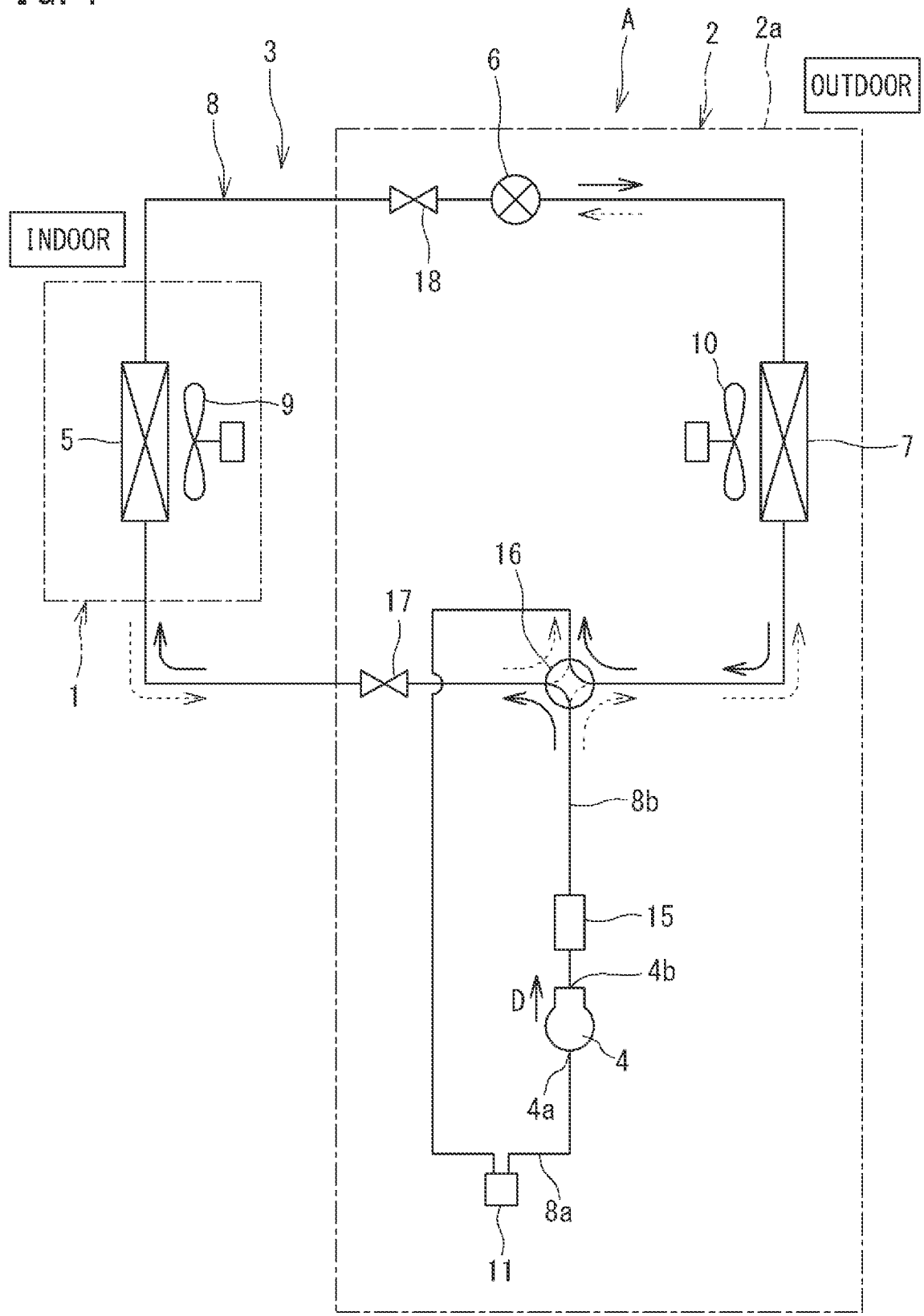
FIG. 1 is a schematic configuration diagram of a refrigeration apparatus according to one or more embodiments of the present disclosure.

FIG. 1 is a schematic configuration diagram of an air conditioner or an air conditioning system A that is a refrigeration apparatus according to one or more embodiments of the present disclosure. The air conditioner A adjusts temperature and humidity in an air-conditioned room by a vapor compression refrigeration cycle. The air conditioner A includes an indoor unit 1 installed within the room and an outdoor unit 2 installed outside the room. The indoor unit 1 and the outdoor unit 2 are connected to each other by a refrigerant pipe 8.

The air conditioner A includes a refrigerant circuit 3 that performs the vapor compression refrigeration cycle. The refrigerant circuit 3 includes a plurality of components and the refrigerant pipe 8 connecting the plurality of components.

The refrigerant circuit 3 includes a compressor 4 that compresses a refrigerant and generates a high-temperature and high-pressure gas refrigerant, an indoor heat exchanger 5, an electronic expansion valve 6 that decompresses the refrigerant, an outdoor heat exchanger 7, an accumulator 11, a muffler 15, a four-way switching valve 16, and the like, which are connected by the refrigerant pipe 8. The compressor 4, the indoor heat exchanger 5, the electronic expansion valve 6, the outdoor heat exchanger 7, the accumulator 11, the muffler 15, the four-way switching valve 16, and a gas shutoff valve and a liquid shutoff valve to be described later are devices and components constituting the air conditioner A, and are connected to other devices and components by the refrigerant pipe 8. In the present specification, these devices and components are also referred to as components constituting the refrigeration apparatus.

The compressor 4 compresses a low-pressure gas refrigerant and generates a high-pressure gas refrigerant. The compressor 4 has a suction port or a suction portion 4a and a discharge port or a discharge portion 4b. The low-pressure gas refrigerant is suctioned through the suction portion 4a. The high-pressure gas refrigerant is discharged through the discharge portion 4b in the direction of arrow D. As the compressor 4, various compressors such as a scroll compressor can be adopted, for example. The compressor 4 is fixed to a bottom plate or the like of a casing 2a of the outdoor unit 2.

The indoor heat exchanger 5 is provided for the indoor unit 1, and exchanges heat between the refrigerant and air within the room. As the indoor heat exchanger 5, a cross-fin type fin-and-tube heat exchanger, a microchannel heat exchanger, or the like can be adopted, for example. An indoor fan 9 for sending air within the room to the indoor heat exchanger 5 and sending conditioned air into the room is disposed near the indoor heat exchanger 5.

The electronic expansion valve 6 is provided for the refrigerant pipe 8 of the refrigerant circuit 3 between the outdoor heat exchanger 7 and the indoor heat exchanger 5, and expands inflowing refrigerant to decompress the refrigerant to a predetermined pressure.

The outdoor heat exchanger 7 exchanges heat between the refrigerant and outdoor air. As the outdoor heat exchanger 7, a cross-fin type fin-and-tube heat exchanger, a microchannel heat exchanger, or the like can be adopted, for example. An outdoor fan 10 for sending outdoor air to the outdoor heat exchanger 7 is disposed near the outdoor heat exchanger 7.

In one or more embodiments, the accumulator 11 is provided for a refrigerant pipe 8a on a suction side of the compressor 4. The accumulator 11 is fixed to the bottom plate or the like of the casing 2a of the outdoor unit 2. The muffler 15 for reducing pressure pulsation of the refrigerant discharged from the compressor 4 is provided for a refrigerant pipe 8b on a discharge side of the compressor 4.

The refrigerant pipe 8 is provided with the four-way switching valve 16 for switching a refrigerant flow path, a gas shutoff valve 17, and a liquid shutoff valve 18. By switching the four-way switching valve 16, it is possible to reverse a flow of the refrigerant, and to switch the refrigerant discharged from the compressor 4 to be supplied to the outdoor heat exchanger 7 or the indoor heat exchanger 5, and thus an operation can be switched between a cooling operation and a heating operation.

The gas shutoff valve 17 and the liquid shutoff valve 18 open or close the refrigerant path. The opening and closing are performed manually, for example. When the air conditioner A is installed, the gas shutoff valve 17 and the liquid shutoff valve 18 are closed to prevent the refrigerant enclosed in the outdoor unit 2 from leaking outside, for example. On the other hand, when the air conditioner A is used, the gas shutoff valve 17 and the liquid shutoff valve 18 are opened.

During the heating operation of the air conditioner A, by switching the four-way switching valve 16 as indicated by a solid line, the refrigerant flows in a direction indicated by an arrow of the solid line. As a result, the high-pressure gas refrigerant discharged from the compressor 4 in the direction of arrow D passes through the muffler 15 and the four-way switching valve 16, then passes through the gas shutoff valve 17 that is opened, and then enters the indoor heat exchanger 5. The high-pressure gas refrigerant radiates heat while the high-pressure gas refrigerant turns into a high-pressure liquid refrigerant in the indoor heat exchanger 5. The high-pressure liquid refrigerant reaches the electronic expansion valve 6 via the liquid shutoff valve 18 that is opened, and is decompressed by the electronic expansion valve 6. The decompressed refrigerant reaches the outdoor heat exchanger 7, absorbs heat in the outdoor heat exchanger 7, and turns into a low-pressure gas refrigerant. The low-pressure gas refrigerant is suctioned into the compressor 4 via the four-way switching valve 16 and the accumulator 11.

During the heating operation, the indoor heat exchanger 5 functions as a radiator, and the outdoor heat exchanger 7 functions as a heat absorber.

On the other hand, during the cooling operation, the flow of the refrigerant is reversed by switching the four-way switching valve 16 as indicated by a dotted line, and the refrigerant flows in a direction indicated by an arrow of the dotted line. As a result, the high-pressure gas refrigerant discharged from the compressor 4 in the direction of arrow D passes through the muffler 15 and the four-way switching valve 16, and then enters the outdoor heat exchanger 7. The high-pressure gas refrigerant radiates heat while the high-pressure gas refrigerant turns into a high-pressure liquid refrigerant in the outdoor heat exchanger 7. The high-pressure liquid refrigerant reaches the electronic expansion valve 6 and is decompressed by the electronic expansion valve 6. The decompressed refrigerant reaches the indoor heat exchanger 5 via the opened liquid shutoff valve 18, absorbs heat in the indoor heat exchanger 5, and turns into a low-pressure gas refrigerant. The low-pressure gas refrigerant is suctioned into the compressor 4 via the gas shutoff valve 17 that is opened, the four-way switching valve 16, and the accumulator 11. During the cooling operation, the indoor heat exchanger 5 functions as a heat absorber, and the outdoor heat exchanger 7 functions as a radiator.

[Air Conditioner B]

Figure 2:
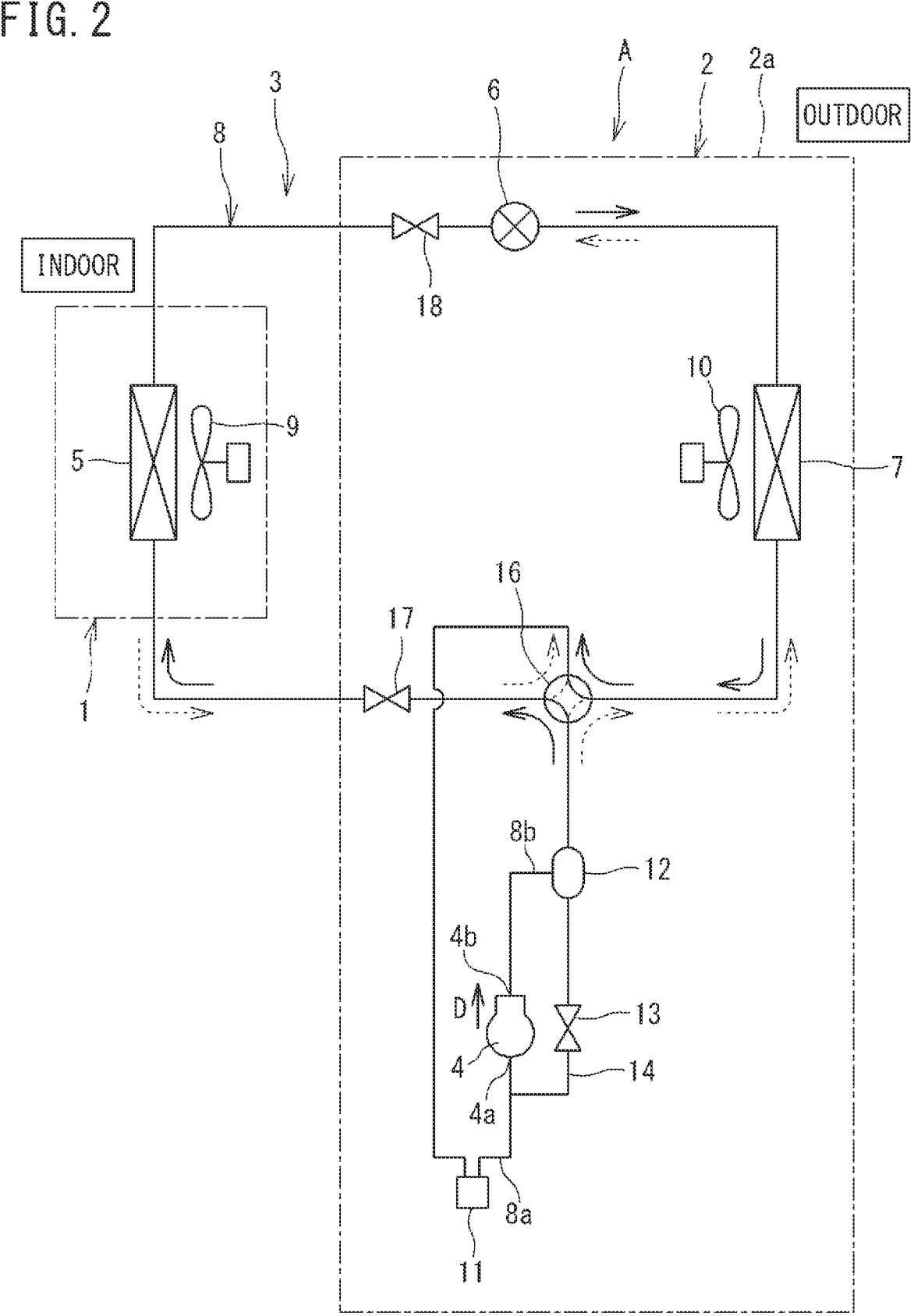
FIG. 2 is a schematic configuration diagram of a refrigeration apparatus according to one or more embodiments of the present disclosure.

FIG. 2 is a schematic configuration diagram of an air conditioner or an air conditioning system B that is a refrigeration apparatus according to one or more embodiments of the present disclosure. The air conditioner B is provided with an oil separator 12, in place of the muffler 15, in the refrigerant pipe 8b on the discharge side of the compressor 4. Oil separated by the oil separator 12 is returned to the refrigerant pipe 8a on the suction side of the compressor 4 via an oil return pipe 14 in which the valve 13 is disposed. Configurations other than the oil separator 12, the valve 13, and the oil return pipe 14 are the same as those in the example illustrated in FIG. 1, and common components or elements are denoted by the same reference numerals. For the sake of simplicity, descriptions of the common components or elements shall be omitted. In the example shown in FIGS. 1 to 2, one of the muffler 15 and the oil separator 12 is provided in the refrigerant pipe 8b on the discharge side of the compressor 4, but both of the muffler 15 and the oil separator 12 may be provided in the refrigerant pipe 8b.

[Switching Mechanism C]

Figure 3:
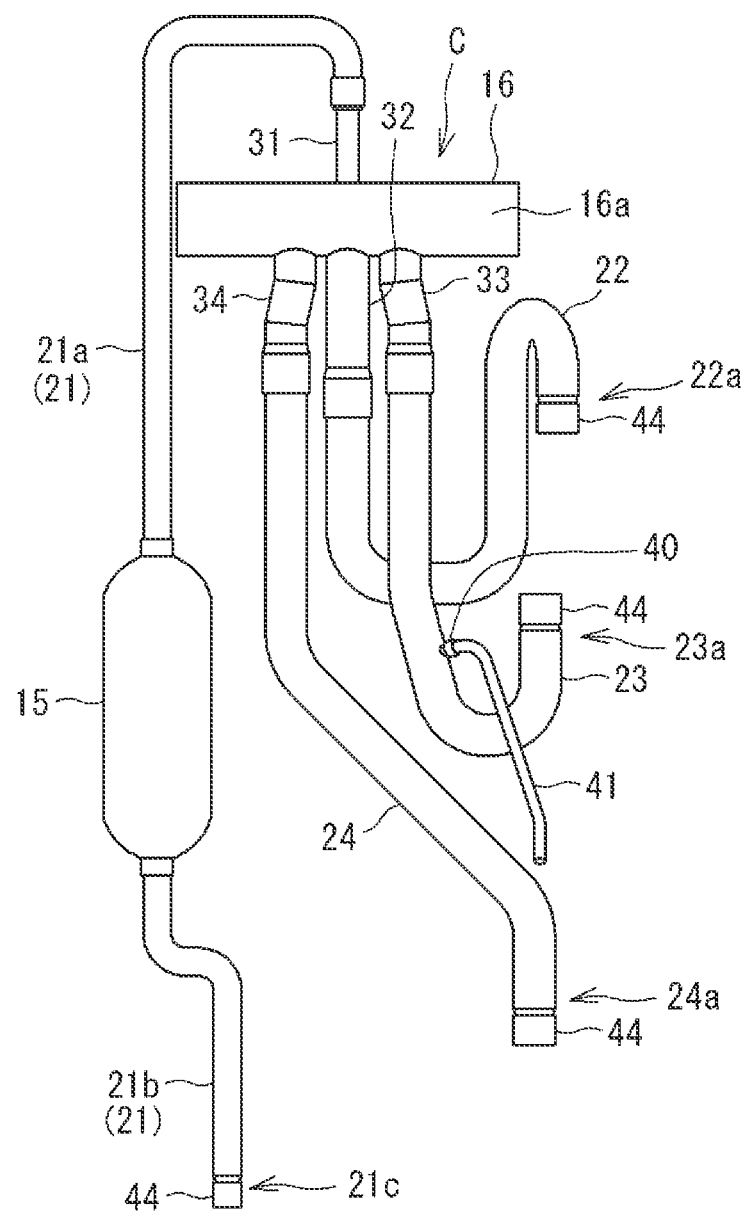
FIG. 3 is an explanatory front view of an example of a switching mechanism including a refrigerant pipe according to one or more embodiments of the present disclosure.
Figure 4:
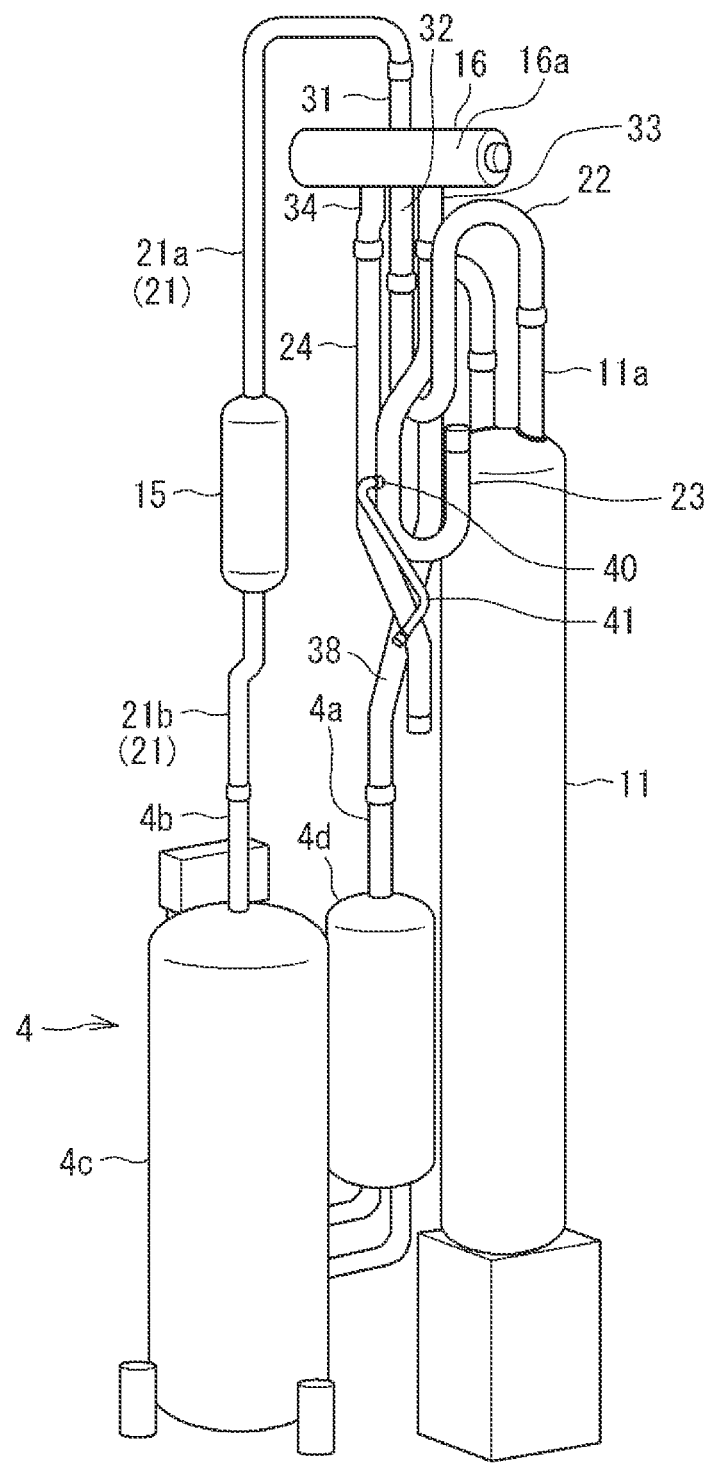
FIG. 4 is an explanatory perspective view around a compressor including the switching mechanism illustrated in FIG. 3.

FIG. 3 is an explanatory front view of a switching mechanism C in the air conditioner devices A and B according to one or more embodiments, and FIG. 4 is an explanatory perspective view around a compressor including the switching mechanism C illustrated in FIG. 3. The switching mechanism C includes a refrigerant pipe according to one or more embodiments of the present disclosure to be described later.

The switching mechanism C includes the four-way switching valve 16 and pipes 21, 22, 23, and 24 respectively connected to four ports or connecting ports of the four-way switching valve 16. The four-way switching valve 16 including the four ports and the pipes 21, 22, 23, and 24 are made of stainless steel having higher rigidity than copper. Examples of the stainless steel to be used include SUS304, SUS304L, SUS436L, SUS430 or the like. In one or more embodiments, the switching mechanism includes, not only the four-way switching valve 16, but also the pipes connected to the four ports of the four-way switching valve 16. In other words, a component that can be assembled as a unit or an assembly in advance in a factory or the like and that has a function of switching the refrigerant flow path serves as the switching mechanism. The switching mechanism C is connected to a connecting portion or a connecting pipe provided for a component such as the compressor 4 or the accumulator 11 by brazing or the like at a site where the outdoor unit 2 is assembled.

The four-way switching valve 16 includes a valve main body 16a constituting an outer shell, a valve body accommodated in the valve main body 16a, and the like. The valve main body 16a is made of stainless steel. The four-way switching valve 16 includes four ports that are short pipes and constitute refrigerant inlet and outlet ports, that is, a first port 31, a second port 32, a third port 33, and a fourth port 34. The first to fourth ports 31 to 34 are made of stainless steel. To the first to fourth ports 31 to 34, one ends of the pipe 21, the pipe 22, the pipe 23, and the pipe 24 are respectively connected.

In an installed state of the four-way switching valve 16, the first port 31 has an upward posture, and the second to fourth ports 32, 33, and 34 have a downward posture.

The connecting portions 44 made of copper are respectively provided at end portions 22a, 23a, and 24a of the pipes 22 to 24 made of stainless steel (end portions on the side opposite to the side of ends connected to the four-way switching valve 16). Further, in one or more embodiments, the muffler 15 is made of stainless steel. The pipe 21 in one or more embodiments is a pipe that causes the refrigerant to flow between the four-way switching valve 16 and the compressor 4 via the muffler 15, and includes a pipe 21a that connects the first port 31 of the four-way switching valve 16 and the muffler 15, and a pipe 21b that connects the muffler 15 and the discharge portion 4b of the compressor 4. The pipe 21a extends upward from the muffler 15 and then turns back to be connected to the first port 31 in a downward posture. For an end portion 21c of the pipe 21b (an end portion opposite to a side connected to the muffler 15), a copper connecting portion 44 is provided, similarly to the pipes 22 to 24.

The pipe 22 connects the second port 32 of the four-way switching valve 16 and the connecting pipe 11a on the inlet side of the accumulator 11. The pipe 22 connected to the connecting pipe 11a on the inlet side of the accumulator 11 extends upward, turns back and extends downward, and then turns back upward again to be connected to the second port 32 in an upward posture. One end of a refrigerant pipe 38 is connected to a connecting pipe (not illustrated) on an outlet side of the accumulator 11, and the other end of the refrigerant pipe 38 is connected to the suction portion of the compressor 4. The refrigerant pipe 38 is also made of stainless steel. As illustrated in FIG. 4, the compressor 4 in one or more embodiments includes an auxiliary accumulator 4d integrated with a compressor main body 4c, and the suction portion 4a of the auxiliary accumulator 4d functions as the suction portion of the compressor 4.

The pipe 23 causes the refrigerant to flow between a gas header (not shown) of the outdoor heat exchanger 7 and the third port 33 of the four-way switching valve 16. In addition, the pipe 24 connects the gas shutoff valve 17 and the fourth port 34 of the four-way switching valve 16.

In the switching mechanism C shown in FIG. 3, the connection between stainless steels and the connection between stainless steel and copper are both performed by furnace brazing. In one or more embodiments, the switching mechanism C as a whole obtained by temporarily assembling the four-way switching valve 16, the muffler 15, the pipes 21, 22, 23, and 24, and a copper joint 40 to be described later is introduced into a furnace, and all connecting portions are simultaneously subjected to furnace brazing.

[Refrigerant Pipe R1]

Figure 5:
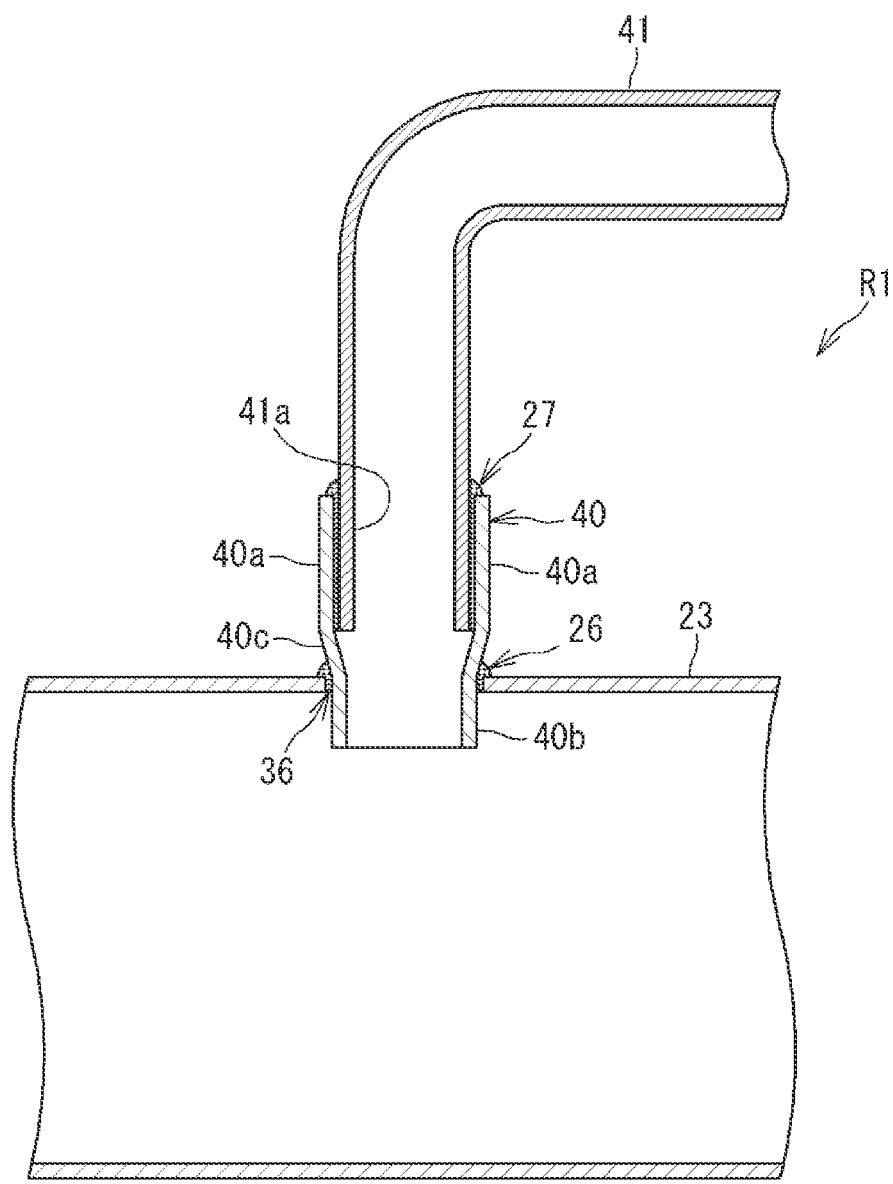
FIG. 5 is an explanatory cross-sectional view of the refrigerant pipe according to one or more embodiments of the present disclosure.

FIG. 5 is an explanatory cross-sectional view of a refrigerant pipe R1 according to one or more embodiments of the present disclosure. As illustrated in FIGS. 3 to 4, a thin tube 41 made of copper is connected to an outer peripheral surface of the pipe 23 via the copper joint 40. The pipe 23, the joint 40, and the thin tube 41 constitute the refrigerant pipe R1 according to one or more embodiments of the present disclosure. More specifically, the refrigerant pipe R1 includes the pipe 23 which is a first pipe made of stainless steel, the joint 40 which is a joint pipe provided on the outer peripheral surface of the pipe 23, and the thin tube 41 which is a second pipe having a pipe diameter smaller than that of the pipe 23 and connected to the outer peripheral surface of the pipe 23 via the joint 40. A material of the joint 40 is copper which is a material different from stainless steel as the material of the pipe 23. An outer peripheral surface 41a of the thin tube 41, which is the surface to be connected to the joint 40, is made of an identical material (copper) as that of the joint 40. As described above, the copper joint 40 and the stainless pipe 23 can be connected by furnace brazing. On the other hand, the copper joint 40 and the copper thin tube 41 can be connected by manually carried out brazing (manual brazing) such as torch brazing (burner brazing). In FIG. 5, a reference numeral 26 denotes a brazing material used at the time of furnace brazing, and a reference numeral 27 denotes a brazing material used at the time of manual brazing. In FIG. 5 and FIGS. 8, 9, 11, and 13 described later, thickness of the brazing material in a pipe radial direction is exaggerated for easy understanding of the brazed portion.

Since the diameter of the thin tube 41 is smaller than those of the other refrigerant pipes, when the thin tube is made of stainless steel, there is an adverse effect that the manufacturing cost increases in order to obtain predetermined accuracy. Therefore, in one or more embodiments, the thin tube 41 is made of copper, and only the joint pipe 40 made of copper is connected to the pipe 23 by furnace brazing. When the thin tube 41 and the joint 40 are connected to the pipe 23 by furnace brazing, the strength of the thin tube 41 may decrease at the time of annealing in the furnace. However, in one or more embodiments, only the joint 40 is connected to the pipe 23 by furnace brazing. As a result, the thin tube 41 can be connected to the pipe 23 via the joint 40 by manual brazing without reducing the strength of the thin tube 41.

In the present specification, "identical material" means that main components are the same, and is not limited only to the case where the constituent components are identical. For example, copper and a copper alloy containing copper as a main component are the identical material, and an aluminum alloy containing aluminum as a main component and another aluminum alloy containing aluminum as a main component are the identical material. A copper alloy is an alloy in which other metals are added to copper as a main component to improve the properties of copper. The aluminum alloy is an alloy in which other metals are added to aluminum as a main component to improve the properties of aluminum. In the present specification, "copper" is "pure copper" containing copper as a main component in an amount of 99.9 wt % or more, and "aluminum" is "pure aluminum" containing aluminum as a main component in an amount of 99.9 wt % or more.

Figure 6:
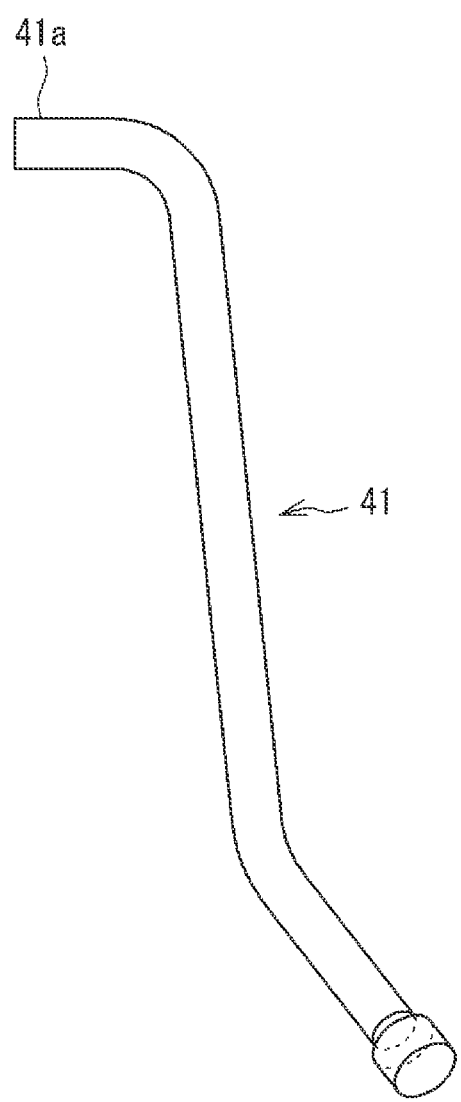
FIG. 6 is an explanatory view of a thin tube of the refrigerant pipe illustrated in FIG. 5.
Figure 7:
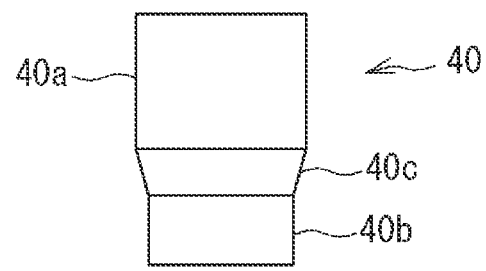
FIG. 7 is an explanatory view of a joint of the refrigerant pipe illustrated in FIG. 5.

The thin tube 41 can be used as a service port, and is used for attaching functional components such as a pressure sensor or filling a refrigerant at the time of maintenance or inspection of the air conditioner device A. As illustrated in FIG. 6, one end side (tip side) of the thin tube 41 is subjected to flared processing. As illustrated in FIG. 7, the joint 40 has a flared shape in which one end side is enlarged in diameter. The joint 40 includes a first large-diameter portion 40*a* subjected to flared processing, a first small-diameter portion 40*b* in a form of a short pipe having a diameter smaller than that of the first large-diameter portion 40*a*, and a first inclined portion 40*c* connecting the first large-diameter portion 40*a* and the first small-diameter portion 40*b*. The first small-diameter portion 40*b* is inserted into a hole 36 formed in the pipe 23. At this time, the first inclined portion 40*c* connected to one end of the first small-diameter portion 40*b* inserted into the hole 36 and having an increased diameter from the one end functions as a first positioning mechanism that sets a position of the joint 40 with respect to the pipe 23. By an outer peripheral surface of the first inclined portion 40*c* abutting on a peripheral edge of the hole 36, the position of the joint 40 with respect to the pipe 23 is set. The position of the joint 40 with respect to the pipe 23 can be easily set by the first inclined portion 40*c*. The joint 40 is provided for the pipe 23 in a direction orthogonal to the pipe axis direction of the pipe 23.

Then, the other end 41*a* (end portion opposite to the one end side subjected to flared processing) of the thin tube 41 illustrated in FIG. 6 is inserted into the first large-diameter portion 40*a* subjected to flared processing of the joint 40. At this time, the first inclined portion 40*c* connected to one end of the first large-diameter portion 40*a* into which the thin tube 41 is inserted and reduced in diameter from the one end functions as a second positioning mechanism that sets a position of the thin tube 41 with respect to the joint 40. By the other end 41*a* of the thin tube 41 abutting on an inner peripheral surface of the first inclined portion 40*c*, the position of the thin tube 41 with respect to the joint 40 is set. The position of the thin tube 41 with respect to the joint 40 can be easily set by the first inclined portion 40*c*. In the refrigerant pipe R1, the first inclined portion 40*c* of the joint 40 functions as the first positioning mechanism as well as the second positioning mechanism.

[Refrigerant Pipe R2]

Figure 8:
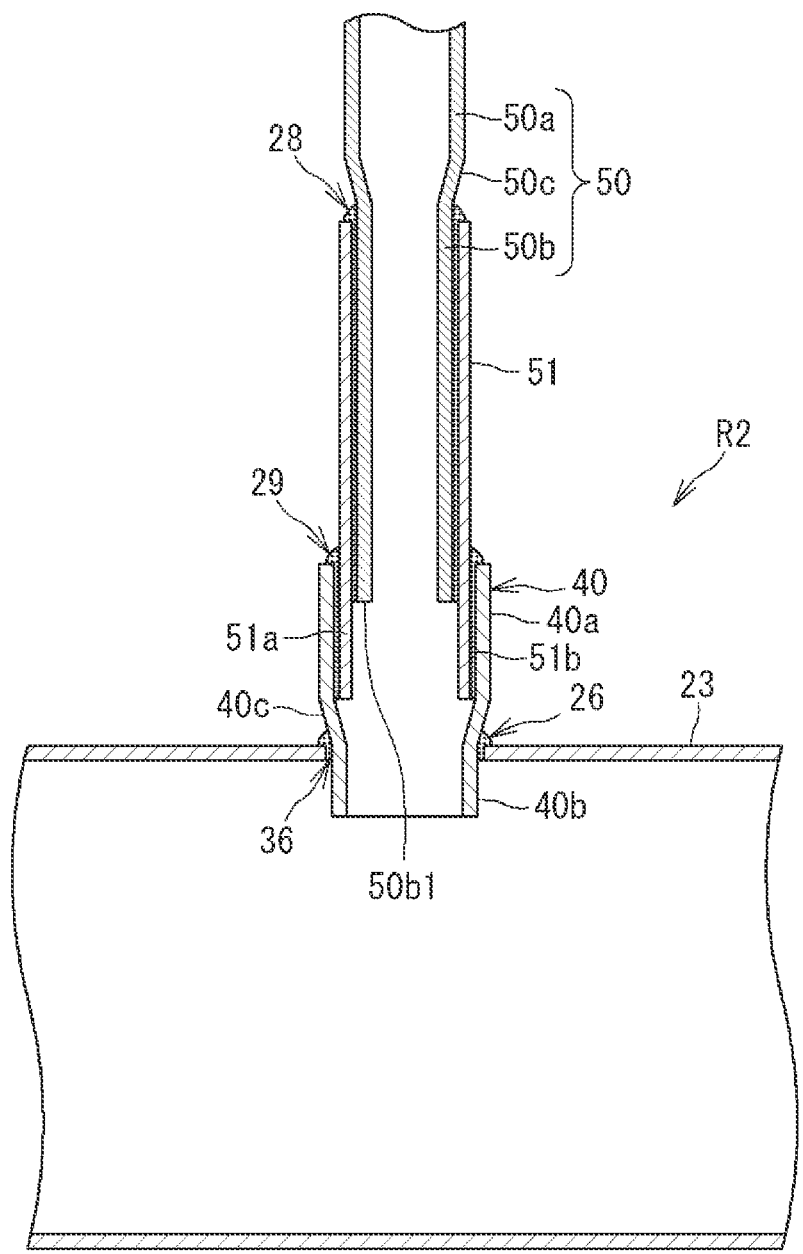
FIG. 8 is an explanatory cross-sectional view of the refrigerant pipe according to one or more embodiments of the present disclosure.

FIG. 8 is an explanatory cross-sectional view of a refrigerant pipe R2 according to one or more embodiments of the present disclosure. The refrigerant pipe R2 is different from the refrigerant pipe R1 described above in that for the second pipe connected to the pipe 23 made of stainless steel, a pipe main body 50 made of stainless steel and a copper pipe 51 as a connecting portion provided for an end portion of the pipe main body 50 are used, instead of the thin tube 41 made of copper. Therefore, in the refrigerant pipe R2, like components or parts common to those of the refrigerant pipe RI are denoted by like reference numerals as those of the refrigerant pipe R1, and description thereof shall be omitted for the sake of simplicity.

In the refrigerant pipe R2, the second pipe constituted by the pipe main body 50 and the copper pipe 51 has a pipe diameter smaller than that of the pipe 23 which is the first pipe. The pipe main body 50 includes a second large-diameter portion 50*a*, a second small-diameter portion 50*b* having a diameter smaller than that of the second large-diameter portion 50*a*, and a second inclined portion 50*c* connecting the second large-diameter portion 50*a* and the second small-diameter portion 50*b*. The copper pipe 51 can be connected to an outer peripheral surface of the second small-diameter portion 50*b* which is an end portion of the pipe main body 50 by furnace brazing. A length of the copper pipe 51 is longer than that of the second small-diameter portion 50*b*, and an end 51*a* of the copper pipe 51 on one side in the axial direction (lower side in FIG. 8) is provided to extend to the one side in the axial direction from a one end 50*b*1 of the second small-diameter portion 50*b*.

An outer peripheral surface 51*b* of the copper pipe 51, which is a surface to be connected to the joint 40, is made of an identical material as the joint 40, and the copper pipe 51 and the joint 40 can be connected by manual brazing. At the time of connection, the second pipe including the pipe main body 50 and the copper pipe 51 subjected to furnace brazing is inserted into the first large-diameter portion 40*a* subjected to flared processing of the joint 40. More specifically, the second pipe is inserted into the first large-diameter portion 40*a* from the end 51*a* on one side in the axial direction of the copper pipe 51. At this time, the first inclined portion 40*c* of the joint 40 functions as the second positioning mechanism that sets a position of the copper pipe 51 with respect to the joint 40. By the end 51*a* of the copper pipe 51 abutting on the inner peripheral surface of the first inclined portion 40*c*, the position of the copper pipe 51 with respect to the joint 40 is set. The position of the copper pipe 51 with respect to the joint 40 can be easily set by the first inclined portion 40*c*. Here, similarly to the refrigerant pipe R1, when the first small-diameter portion 40*b* of the joint 40 is inserted into the hole 36 formed in the pipe 23, the first inclined portion 40*c* functions as the first positioning mechanism that sets the position of the joint 40 with respect to the pipe 23. The position of the joint 40 with respect to the pipe 23 can be easily set by the first inclined portion 40*c*. In FIG. 8, a reference numeral 28 denotes a brazing material used at the time of furnace brazing, and a reference numeral 29 denotes a brazing material used at the time of manual brazing.

The pipe main body 50 can be used as a service port, and is used for attaching functional components such as a pressure sensor or filling a refrigerant at the time of maintenance or inspection of the air conditioner device A.

[Refrigerant Pipe R3]

Figure 9:
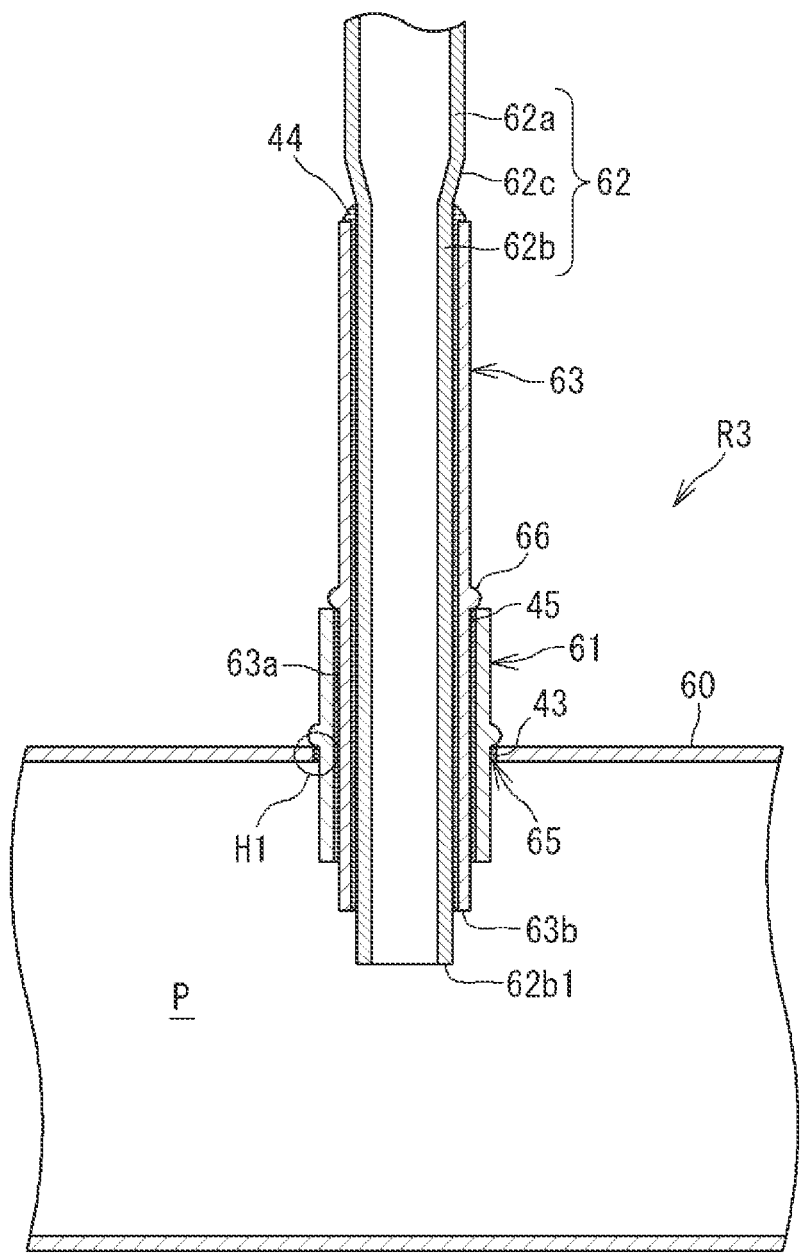
FIG. 9 is an explanatory cross-sectional view of the refrigerant pipe according to one or more embodiments of the present disclosure.
Figure 10:
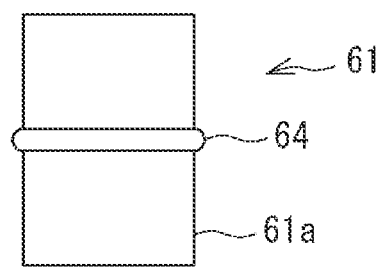
FIG. 10 is an explanatory view of the joint of the refrigerant pipe illustrated in FIG. 9.

FIG. 9 is an explanatory cross-sectional view of a refrigerant pipe R3 according to one or more embodiments of the present disclosure, and FIG. 10 is an explanatory view of the joint of the refrigerant pipe R3 illustrated in FIG. 9.

The refrigerant pipe R3 includes a pipe 60 which is a first pipe made of stainless steel, a joint 61 which is a joint pipe provided on an outer peripheral surface of the pipe 60, and a second pipe having a pipe diameter smaller than that of the pipe 60 and connected to the outer peripheral surface of the pipe 60 via the joint 61. The second pipe of the refrigerant pipe R3 includes a pipe main body 62 made of stainless steel, and a copper pipe 63 which is a connecting portion provided for an end portion of the pipe main body 62. In the refrigerant pipe R3, the second pipe constituted by the pipe main body 62 and the copper pipe 63 has a pipe diameter smaller than that of the pipe 60 which is the first pipe. A material of the joint 61 is copper which is a material different from stainless steel as the material of the pipe 60. An outer peripheral surface 63*a* of the copper pipe 63, which is a surface to be connected to the joint 61, is made of the identical material (copper) as the joint 61.

As illustrated in FIG. 10, the joint 61 is in a short pipe shape. An annular bead 64 is disposed near an axial center of an outer peripheral surface 61*a* of the joint 61. As illustrated in FIG. 9, when the joint 61 is inserted into the hole 65 formed in the pipe 60, the bead 64 functions as the first positioning mechanism that sets a position of the joint 61 with respect to the pipe 60. By the bead 64 abutting on a peripheral edge of the hole 65, the position of the joint 61 with respect to the pipe 60 is set. The position of the joint 61 with respect to the pipe 60 can be easily set by the bead 64. The joint 61 is provided for the pipe 60 in a direction orthogonal to the pipe axis direction of the pipe 60.

The pipe main body 62 includes a second large-diameter portion 62a, a second small-diameter portion 62b having a diameter smaller than that of the second large-diameter portion 62a, and a second inclined portion 62c connecting the second large-diameter portion 62a and the second small-diameter portion 62b. The copper pipe 63 can be connected to an outer peripheral surface of the second small-diameter portion 62b which is an end portion of the pipe main body 62 by furnace brazing. A length of the second small-diameter portion 62b is longer than that of the copper pipe 63, and an end 62b1 on one side in the axial direction (lower side in FIG. 9) of the second small-diameter portion 62b is provided to extend to the one side in the axial direction from a one end 63b of the copper pipe 63. Note that the length of the copper pipe 63 may be longer than the length of the second small-diameter portion 62b of the pipe main body 62 as long as a margin for brazing between the joint 61 and the copper pipe 63 is secured.

An annular bead 66 is disposed near the axial center of the outer peripheral surface 63a of the copper pipe 63. As illustrated in FIG. 9, when the second pipe including the pipe main body 62 and the copper pipe 63 is inserted into the joint 61 provided in the pipe 60, the bead 66 functions as the second positioning mechanism that sets a position of the second pipe with respect to the joint 61. By the bead 66 abutting on a peripheral edge of an opening of the joint 61, the position of the second pipe with respect to the joint 61 is set. The position of the second pipe with respect to the joint 61 can be easily set by the bead 66.

In the refrigerant pipe R3, a material of the joint 61 is copper which is a material different from stainless steel as the material of the pipe 60. Further, the outer peripheral surface 63a of the copper pipe 63 constituting the second pipe, which is a surface to be connected to the joint 61, is made of the identical material (copper) as the joint 61. The copper joint 61 and the stainless pipe 60 can be connected by furnace brazing. On the other hand, the copper joint 61 and the copper pipe 63 can be connected by manual brazing. In FIG. 9, reference numerals 43 and 44 denote brazing materials used at the time of furnace brazing, and a reference numeral 45 denotes a brazing material used at the time of manual brazing.

The pipe main body 62 can be used as a service port, and is used for attaching functional components such as a pressure sensor or filling a refrigerant at the time of maintenance or inspection of the air conditioner device A.

In the refrigerant pipe R3, the second pipe is connected to the pipe 60 such that the end 62b1 of the pipe main body 62 of the second pipe is positioned within the pipe 60. In other words, the end 62b1 of the pipe main body 62 of the second pipe is entirely located on a side closer to a flow path P through which the refrigerant flows in the pipe 60 than the outer peripheral surface of the pipe 60 (see FIG. 9). The pipe main body 62 and the copper pipe 63 of the second pipe overlap the pipe 60 in the pipe radial direction of the second pipe. At a connecting portion H1 where the joint 61 is connected to the pipe 60 (see FIG. 9), the pipe main body 62 and the copper pipe 63 of the second pipe overlap with the pipe 60 in the pipe radial direction of the second pipe. In this case, since the pipe main body 62 of the second pipe is connected to the pipe 60 via the joint 61, in the connecting portion H1 between the joint 61 and the pipe 60, the pipe main body 62 and the copper pipe 63 of the second pipe, as well as the joint 61 exist in the pipe radial direction of the second pipe. In addition, the pipe main body 62 is made of stainless steel and has higher rigidity than a copper pipe. Due to the presence of the pipe main body 62 and the copper pipe 63, not only the strength of the connecting portion H1 between the joint 61 and the pipe 60 but also the strength of the connection between the first pipe and the second pipe via the joint 61 can be improved as compared with the case where only the joint 61 is present. If the refrigerant pipe R3 includes a portion in which copper is present alone, stress is concentrated on the portion and may cause damages. However, since the refrigerant pipe R3 does not include a portion in which copper is present alone, damage due to stress concentration can also be suppressed.

[Refrigerant Pipe R4]

Figure 11:
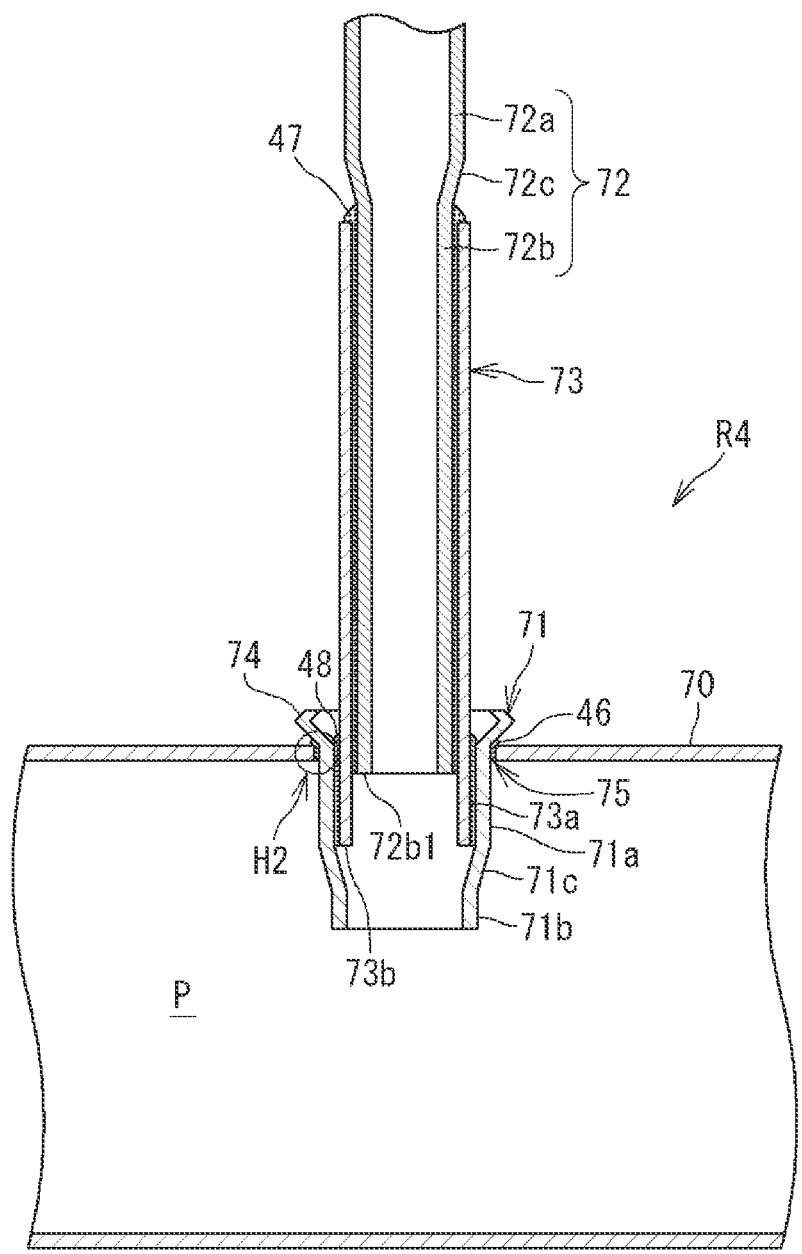
FIG. 11 is an explanatory cross-sectional view of the refrigerant pipe according to one or more embodiments of the present disclosure.
Figure 12:
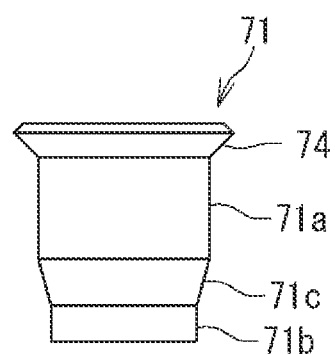
FIG. 12 is an explanatory view of the joint of the refrigerant pipe illustrated in FIG. 11.

FIG. 11 is an explanatory cross-sectional view of a refrigerant pipe R4 according to one or more embodiments of the present disclosure, and FIG. 12 is an explanatory view of the joint of the refrigerant pipe R4 illustrated in FIG. 11.

The refrigerant pipe R4 includes a pipe 70 which is a first pipe made of stainless steel, a joint 71 which is a joint pipe provided on an outer peripheral surface of the pipe 70, and a second pipe having a pipe diameter smaller than that of the pipe 70 and connected to the outer peripheral surface of the pipe 70 via the joint 71. The second pipe of the refrigerant pipe R4 includes a pipe main body 72 made of stainless steel, and a copper pipe 73 which is a connecting portion provided for an end portion of the pipe main body 72. In the refrigerant pipe R4, the second pipe constituted by the pipe main body 72 and the copper pipe 73 has a pipe diameter smaller than that of the pipe 70 which is the first pipe. A material of the joint 71 is copper which is a material different from stainless steel as the material of the pipe 70. An outer peripheral surface 73a of the copper pipe 73, which is a surface to be connected to the joint 71, is made of the identical material (copper) as the joint 71.

As illustrated in FIG. 12, the joint 71 is in a short pipe shape. The joint 71 includes a first large-diameter portion 71a, a first small-diameter portion 71b having a diameter smaller than that of the first large-diameter portion 71a, and a first inclined portion 71c connecting the first large-diameter portion 71a and the first small-diameter portion 71b. An enlarged diameter portion 74 is provided by flared processing at one axial end of the first large-diameter portion 71a. As illustrated in FIG. 10, when the joint 71 is inserted into the hole 75 formed in the pipe 70, the enlarged diameter portion 74 functions as a first positioning mechanism that sets a position of the joint 71 with respect to the pipe 70. By an outer peripheral surface of the enlarged diameter portion 74 abutting on a peripheral edge of the hole 75, the position of the joint 71 with respect to the pipe 70 is set. The position of the joint 71 with respect to the pipe 70 can be easily set by the enlarged diameter portion 74. The joint 71 is provided for the pipe 70 in a direction orthogonal to the pipe axis direction of the pipe 70.

The pipe main body 72 includes a second large-diameter portion 72a, a second small-diameter portion 72b having a diameter smaller than that of the second large-diameter portion 72a, and a second inclined portion 72c connecting the second large-diameter portion 72a and the second small-diameter portion 72b. The copper pipe 73 can be connected to an outer peripheral surface of the second small-diameter portion 72b which is an end portion of the pipe main body 72 by furnace brazing. A length of the copper pipe 73 is longer than that of the second small-diameter portion 72b, and an end 73b of the copper pipe 73 on one side in the axial direction (lower side in FIG. 11) is provided to extend to the one side in the axial direction from a one end 72*b*1 of the second small-diameter portion 72*b*.

In the refrigerant pipe R4, a material of the joint 71 is copper which is a material different from stainless steel as the material of the pipe 70. Further, the outer peripheral surface 73*a* of the copper pipe 73 constituting the second pipe, which is a surface to be connected to the joint 71, is made of the identical material (copper) as the joint 71. The copper joint 71 and the stainless pipe 70 can be connected by furnace brazing. On the other hand, the copper joint 71 and the copper pipe 73 can be connected by manual brazing. In order to connect the joint 71 and the copper pipe 73, the second pipe including the pipe main body 72 and the copper pipe 73 subjected to furnace brazing is inserted into the joint 71. At this time, the inclined portion 71*c* of the joint 71 functions as the second positioning mechanism that sets a position of the copper pipe 73 with respect to the joint 71. By the end 73*b* of the copper pipe 73 abutting on the inner peripheral surface of the inclined portion 71*c*, the position of the copper pipe 73 with respect to the joint 71 is set. The position of the second pipe with respect to the joint 71 can be easily set by the inclined portion 71*c*. In FIG. 11, reference numerals 46 and 47 denote brazing materials used at the time of furnace brazing, and a reference numeral 48 denotes a brazing material used at the time of manual brazing.

The pipe main body 72 can be used as a service port, and is used for attaching functional components such as a pressure sensor or filling a refrigerant at the time of maintenance or inspection of the air conditioner device A.

In the refrigerant pipe R4, the second pipe is connected to the pipe 70 such that the end 72*b*1 of the pipe main body 72 of the second pipe is positioned within the pipe 70. In other words, the end 72*b*1 of the pipe main body 72 of the second pipe is entirely located on the side closer to a flow path P through which the refrigerant flows in the pipe 70 than the outer peripheral surface of the pipe 70 (see FIG. 11). The pipe main body 72 and the copper pipe 73 of the second pipe overlap the pipe 70 in the pipe radial direction of the second pipe. In the connecting portion H2 where the joint 71 is provided for the pipe 70 (see FIG. 11), the pipe main body 72 and the copper pipe 73 of the second pipe overlap with the pipe 70 in the pipe radial direction of the second pipe. In this case, since the pipe main body 72 of the second pipe is connected to the pipe 70 via the joint 71, in the connecting portion H2 between the joint 71 and the pipe 70, the pipe main body 72 and the copper pipe 73 of the second pipe, as well as the joint 71 exist in the pipe radial direction of the second pipe. In addition, the pipe main body 72 is made of stainless steel and has higher rigidity than a copper pipe. Due to the presence of the pipe main body 72 and the copper pipe 73, not only the strength of the connecting portion H2 between the joint 71 and the pipe 70 but also the strength of the connection between the first pipe and the second pipe via the joint 71 can be improved as compared with the case where only the joint 71 is present. If the refrigerant pipe R4 includes a portion in which copper is present alone, stress is concentrated on the portion and may cause damages. However, since the refrigerant pipe R4 does not include a portion in which copper is present alone, damage due to stress concentration can also be suppressed.

[Operation and Effect of Embodiments]

When the refrigerant pipe of the refrigeration apparatus is made of stainless steel, connection work between the refrigerant pipe and the thin tube becomes complicated. Therefore, one or more embodiments of the present disclosure provide a refrigeration apparatus and a refrigerant pipe of the refrigeration apparatus that facilitate connection work to a thin tube.

(Operation and Effect)

In each of the above-described embodiments, the joints 40, 61, and 71 respectively provided on the outer peripheral surfaces of the pipes 23, 60, and 70 made of stainless steel are made of copper that is a material different from stainless steel. Further, the surfaces to be connected, which are connected to the joints 40, 61, and 71, of the thin tube 41 (refrigerant pipe R1), the pipe main body 50 and the copper pipe 51 (refrigerant pipe R2), the pipe main body 62 and the copper pipe 63 (refrigerant pipe R3), or the pipe main body 72 and the copper pipe 73 (refrigerant pipe R4) connected to the outer peripheral surfaces of the pipes 23, 60, and 70 via the joints 40, 61, and 71 are made of copper, which is an identical material as the joints 40, 61, and 71. Therefore, it is not necessary to carry out brazing for a stainless pipe which involves complicated work, and the second pipe as a thin tube can be easily connected to the first pipe made of stainless steel.

More specifically, in the case of brazing a stainless pipe, a passive film (oxide film) is disposed on a surface of stainless steel, and thus, in order to perform brazing manually such as torch brazing, a flux for removing the oxide film is required. In the refrigeration apparatus, since the refrigerant flows in the refrigerant circuit 3 which is a closed circuit, if the flux remains in the refrigerant pipe, the flux is mixed in the refrigerant, which may adversely affect the performance of the refrigerant itself and the components such as the compressor 4 into which the refrigerant flows. Therefore, an operation of removing the flux after brazing is essential.

In each of the embodiments described above, the pipes 23, 60, and 70 and the joints 40, 61, and 71 that are made of stainless steel can be connected by furnace brazing. The furnace brazing is a method of performing brazing in a predetermined gas atmosphere within a continuous furnace or the like. The predetermined gas atmosphere is, for example, a hydrogen gas atmosphere in which an oxide film can be removed. Therefore, brazing of stainless steel can be performed without using flux, and as a result, an operation of removing flux after brazing is also unnecessary. Further, since the connection between the joints 40, 61, and 71 and the thin tube 41 (refrigerant pipe R1), the pipe main body 50, and the copper pipe 51 (refrigerant pipe R2), the pipe main body 62, and the copper pipe 63 (refrigerant pipe R3), or the pipe main body 72 and the copper pipe 73 (refrigerant pipe R4), which are the second pipes, is connection between copper components, a flux treatment or the like is unnecessary, and the second pipes can be easily connected to the pipes 23, 60, and 70 made of stainless steel via the joints 40, 61, and 71, respectively.

Further, in each of the embodiments described above, the joints 40, 61, and 71 are made of copper, and the surface to be connected of the thin tube 41 (refrigerant pipe R1), the pipe main body 50 and the copper pipe 51 (refrigerant pipe R2), the pipe main body 62 and the copper pipe 63 (refrigerant pipe R3), or the pipe main body 72 and the copper pipe 73 (refrigerant pipe R4) with the joints 40, 61, and 71 are also made of copper. Therefore, the joints 40, 61, and 71 can be connected to the thin tube 41 and the copper pipes 51, 63, and 73 by manual brazing, and the thin tube 41 and the copper pipes 51, 63, and 73 can be easily connected to the pipes 23, 60, and 70 made of stainless steel.

Moreover, in the above-described embodiments, the second pipe connected to the pipes 23, 60, or 70 made of stainless steel includes the stainless pipe main body 50, 62, or 72 and the copper pipe 51, 63, or 73 as the connecting portion provided at the end of the pipe main body 50, 62, or 72, and the copper pipe 51, 63, or 73 include the outer peripheral surface 51*b*, 63*a*, or 73*a* as the surface to be connected to the joints 40, 61, or 71. The second pipe is connected to the outer peripheral surfaces of the pipe 23, 60, or 70 via the joint 40, 61, or 71 made of a material different from stainless steel, and the surface to be connected of the copper pipe 51, 63, or 73 provided for the pipe main body 50, 62, or 72 of the second pipe is made of an identical material (copper) as that of the joint 40, 61, or 71. Therefore, it is not necessary to carry out brazing for a stainless pipe which involves complicated work, and the copper pipes 51, 63, and 73 can be easily connected to the pipes 23, 60, and 70 made of stainless steel.

Furthermore, in the above-described embodiments, the pipe main bodies 50, 62, and 72 have the second large-diameter portions 50*a*, 62*a*, and 72*a* and the second small-diameter portions 50*b*, 62*b*, and 72*b* having diameters respectively smaller than those of the second large-diameter portions 50*a*, 62*a*, and 72*a*. In addition, the copper pipes 51, 63, and 73 as connecting portions are connected to the outer peripheral surfaces of the second small-diameter portions 50*b*, 62*b*, and 72*b*. In addition, the outer peripheral surfaces 51*b*, 63*a*, and 73*a* of the copper pipes 51, 63, and 73 respectively constitute surfaces to be connected to the joints 40, 61, and 71. The surfaces to be connected and the joints 40, 61, and 71 are made of an identical material (copper), and can be easily connected by a conventional method such as manual brazing. Further, since the pipe main bodies 50, 62, and 72 are made of stainless steel, rigidity can be improved as compared with copper pipes, and cost can be reduced.

In the above-described embodiments, the second pipe connected to the pipe 23 via the joint 40 is the thin tube 41 made of copper. The thin tube 41 made of copper and the joint 40 made of copper can be easily connected by a conventional method such as manual brazing.

Further, in each of the embodiments described above, since the inclined portion 40*c*, the bead 64, and the enlarged diameter portion 74, which are the first positioning mechanisms that set the positions of the joints 40, 61, and 71 with respect to the pipes 23, 60, and 70, respectively, are provided for the joints 40, 61, and 71, the positions of the joints 40, 61, and 71 with respect to the pipes 23, 60, and 70 can be easily set.

Moreover, in the above-described embodiments, the joints 40 and 71 have the inclined portions 40*c* and 71*c* which are the second positioning mechanisms for determining the position of the second pipe with respect to the joints 40 and 71. Furthermore, in the above-described embodiments, the copper pipe 63 has the bead 66 which is the second positioning mechanism for determining the position of the copper pipe 63 with respect to the joint 71. As a result, the position of the second pipe with respect to the joints 40, 61, and 71 can be easily set.

In the above-described embodiments, the pipe main bodies 62 and 72 and the copper pipes 63 and 73 constituting the second pipe overlap the pipes 60 and 70 in the pipe radial direction of the second pipe. More specifically, in the connecting portions H1 and H2 where the joints 61 and 71 are provided for the pipes 60 and 70, the pipe main bodies 62 and 72 and the copper pipes 63 and 73 of the second pipe overlap the pipes 60 and 70 in the pipe radial direction of the second pipe. Since the pipe main bodies 62 and 72 and the copper pipes 63 and 73 are connected to the pipes 60 and 70 via the joints 61 and 71, in the connecting portions H1 and H2 between the joints 61 and 71 and the pipes 60 and 70, the pipe main bodies 62 and 72 and the copper pipes 63 and 73 of the second pipe, and the joints 61 and 71 exist in the pipe radial direction of the second pipe. In addition, the pipe main bodies 62 and 72 are made of stainless steel and have higher rigidity than copper pipes. Due to the presence of the pipe main bodies 62 and 72 and the copper pipes 63 and 73, not only the strength of the connecting portions H1 and H2 between the joints 61 and 71 and the pipes 60 and 70 but also the strength of the connection between the first pipe and the second pipe via the joints 61 and 71 can be improved as compared with the case where only the joints 61 and 71 are present. If the refrigerant pipes R3 and R4 each include a portion in which copper is present alone, stress is concentrated on the portion and may cause damages. However, since the refrigerant pipes R3 and R4 of one or more embodiments do not include a portion in which copper is present alone, damage due to stress concentration can also be suppressed.

The air conditioners A and B according to the above-described embodiments each include the refrigerant circuit 3 including the plurality of components and the refrigerant pipe 8 connecting the plurality of components, and the refrigerant pipe 8 connecting the plurality of components includes the refrigerant pipe according to the above-described embodiments. In the refrigerant pipe according to the above-described embodiments, the joints 40, 61, and 71 respectively provided on the outer peripheral surfaces of the pipes 23, 60, and 70 made of stainless steel are made of copper that is a material different from stainless steel. Further, the surfaces to be connected, which are connected to the joints 40, 61, and 71, of the thin tube 41 (refrigerant pipe R1), the pipe main body 50 and the copper pipe 51 (refrigerant pipe R2), the pipe main body 62 and the copper pipe 63 (refrigerant pipe R3), or the pipe main body 72 and the copper pipe 73 (refrigerant pipe R4) connected to the outer peripheral surfaces of the pipes 23, 60, and 70 via the joints 40, 61, and 71 are made of copper, which is an identical material as the joints 40, 61, and 71. Therefore, it is not necessary to carry out brazing for a stainless pipe which involves complicated work, and the second pipe as a thin tube can be easily connected to the first pipe made of stainless steel.

[Other Modifications]

The present disclosure is not limited to the foregoing embodiments, and various modifications may be made within the claims.

For example, while in the above-described embodiments, a joint made of copper which is a material different from stainless steel is used as the joint provided on the outer peripheral surface of the first pipe made of stainless steel, a copper alloy, aluminum, or an aluminum alloy can also be used other than copper, for example. When a joint made of a copper alloy is used, the surface to be connected of the second pipe to the joint is provided by a copper alloy or copper which is an identical material as the copper alloy. Further, when a joint made of aluminum is used, the surface to be connected of the second pipe to the joint is provided by aluminum or an aluminum alloy which is an identical material as aluminum. Moreover, when a joint made of an aluminum alloy is used, a surface to be connected of the second pipe to the joint is provided by an aluminum alloy or aluminum which is an identical material as the aluminum alloy. As the copper alloy, for example, a copper alloy containing copper in an amount of 98 wt % or more is used. A copper alloy containing copper in an amount of 99 wt % or more may be used. Furthermore, as the aluminum alloy, for example, an aluminum alloy containing 95 wt % or more of aluminum is used.

Further, in the above-described embodiments, when the pipe main body made of stainless steel is used, the pipe main body takes a form with a reduced diameter and includes the second large-diameter portion and the second small-diameter portion, but the present disclosure is not limited to such an example. For example, a pipe made of stainless steel having a constant pipe diameter that is not reduced and covered with a copper pipe can be used as the second pipe.

Further, in the above-described embodiments, the second pipe is constituted by the pipe main body made of stainless steel and the copper pipe. However, as in one or more embodiments, a thin tube made of copper may be used as the second pipe. In this case, the thin tube made of copper which is the second pipe is connected to the outer peripheral surface of the pipe (first pipe) 60 via the joint 61, or connected to the outer peripheral surface of the pipe (first pipe) 70 via the joint 71.

Figure 13:
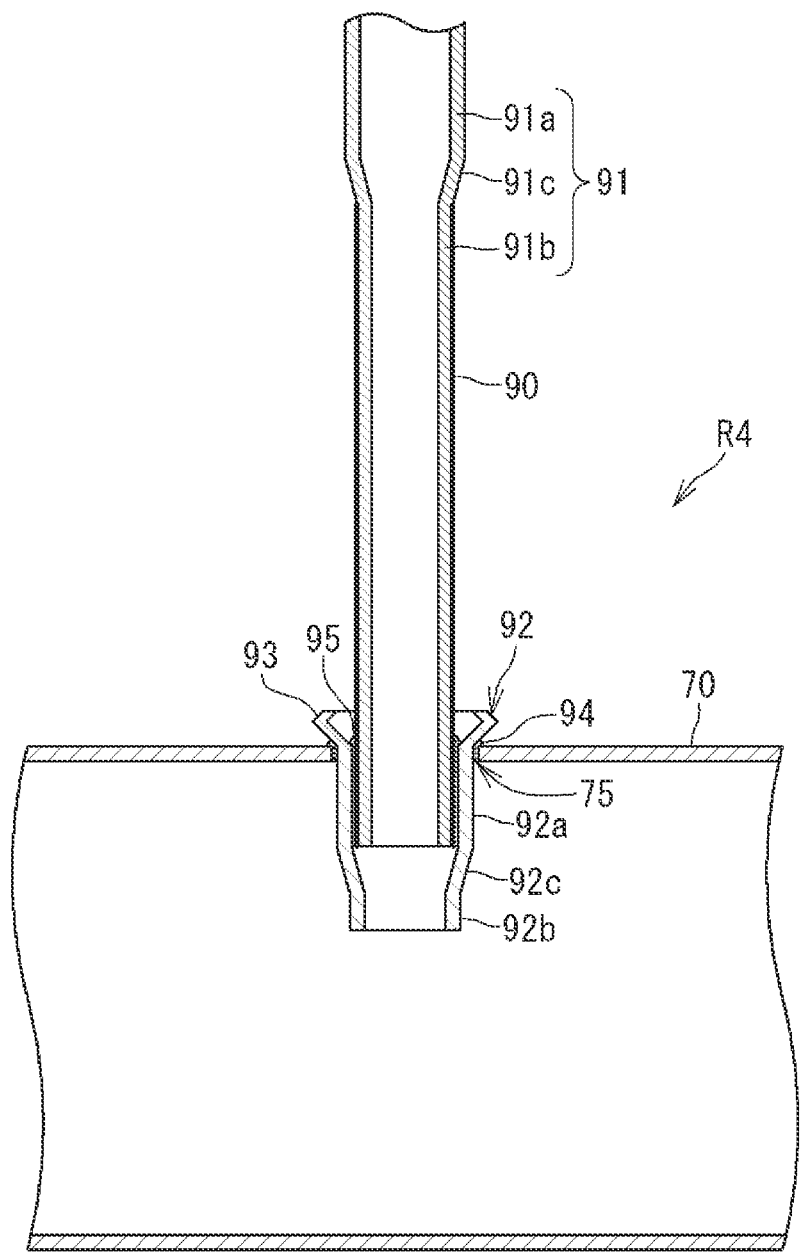
FIG. 13 is an explanatory cross-sectional view of a modification of the refrigerant pipe illustrated in FIG. 11.

Moreover, in the embodiments described above, the outer peripheral surface of the copper pipe functions as a surface to be connected, but a copper plating layer can be used as the surface to be connected as illustrated in FIG. 13. FIG. 13 is an explanatory cross-sectional view of a modification of the refrigerant pipe R4 illustrated in FIG. 11. In such a modification, like components or parts common to those of the refrigerant pipe R4 are denoted by like reference numerals as those of the refrigerant pipe R4, and description thereof shall be omitted for the sake of simplicity.

In the modification illustrated in FIG. 13, a copper plating layer 90 is used in place of the copper pipe 73. A pipe main body 91 made of stainless steel and a copper joint 92 as the second pipe on which the copper plating layer 90 is disposed can be connected by manual brazing. Similarly to the pipe main body 72 of the refrigerant pipe R4, the pipe main body 91 includes a second large-diameter portion 91a, a second small-diameter portion 91b having a diameter smaller than that of the second large-diameter portion 91a, and a second inclined portion 91c connecting the second large-diameter portion 91a and the second small-diameter portion 91b. The copper plating layer 90 is disposed on an outer peripheral surface of the second small-diameter portion 91b of the pipe main body 91. The pipe main body may not have the small-diameter portion. In other words, a thin tube having a constant pipe diameter can be used as the pipe main body, and in this case, a copper plating layer is disposed on an outer peripheral surface of the thin tube.

The joint 92 provided for the pipe 70 is in a short pipe shape, similarly to the joint 71 of the refrigerant pipe R4. The joint 92 includes a first large-diameter portion 92a, a first small-diameter portion 92b having a diameter smaller than that of the first large-diameter portion 92a, and an inclined portion 92c connecting the first large-diameter portion 92a and the first small-diameter portion 92b. An enlarged diameter portion 93 is provided by flared processing at one axial end of the first large-diameter portion 92a. In FIG. 13, a reference numeral 94 denotes a brazing material used at the time of furnace brazing, and a reference numeral 95 denotes a brazing material used at the time of manual brazing.

Also in the refrigerant pipe R2 and the refrigerant pipe R3, a copper plating layer disposed on an outer peripheral surface of the second pipe can be used as the surface to be connected. In this case, too, the copper plating layer of the second pipe can be connected to the copper joint 40 (refrigerant pipe R2) or the copper joint 61 (refrigerant pipe R3) by manual brazing.

Further, in the above-described embodiments, an annular rib (bead) 64 is provided on the outer peripheral surface of the joint 61 as the first positioning mechanism, but the rib may be discontinuously provided on the outer peripheral surface along the circumferential direction. For example, three ribs may be provided at 120-degree intervals along the circumferential direction, or four ribs may be provided at 90-degree intervals along the circumferential direction. Similarly, in the above-described embodiments, an annular rib (bead) 66 is provided on the outer peripheral surface of the copper pipe 63 as the second positioning mechanism, but the rib may be discontinuously provided on the outer peripheral surface along the circumferential direction. For example, three ribs may be provided at 120-degree intervals along the circumferential direction, or four ribs may be provided at 90-degree intervals along the circumferential direction.

Figure 14:
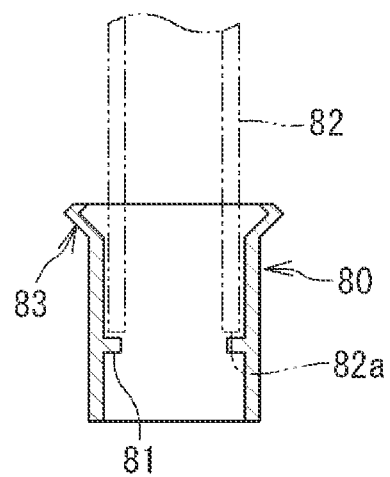
FIG. 14 is an explanatory cross-sectional view of a modification of the joint illustrated in FIG. 12.

Moreover, in the above-described embodiments, the inclined portion 71c of the joint 71 is used as the second positioning mechanism that sets the position of the second pipe with respect to the joint 71, but other configurations can be used. For example, a joint 80 in a short pipe shape as illustrated in FIG. 14 may be adopted as the joint, and an annular rib 81 provided on an inner peripheral surface of the joint 80 may be used as the second positioning mechanism. Upon insertion of a second pipe 82 into the joint 80, a tip 82a of the second pipe 82 abuts on the rib 81, and movement of the second pipe 82 in the axial direction is restricted. As a result, a position of the second pipe 82 with respect to the joint 80 can be easily set. An enlarged diameter portion 83 functioning as the first positioning mechanism that sets a position of the joint 80 with respect to a first pipe (not illustrated) is provided by flared processing at one axial end of the joint 80. Here, also for the rib 81, similarly to the rib 64 or the rib 66 described above, a plurality of ribs can be discontinuously provided on an inner peripheral surface of the joint 80 along the circumferential direction.

Furthermore, in the embodiments described above, the thin tube 41 made of copper is connected to the pipe 23 made of stainless steel via the copper joint 40, and the thin tube 41 is used as a service port. Similarly, a thin tube made of a material different from stainless steel may be connected to the pipe 21 made of stainless steel via a joint made of a material different from stainless steel, and a high pressure sensor may be connected to the thin tube. In addition, a thin tube made of a material different from stainless steel may be connected to the pipe 22 made of stainless steel via a joint made of the material different from stainless steel, and a low-pressure sensor can be connected to the thin tube. Further, a thin tube made of a material different from stainless steel may be connected to the pipe 24 made of stainless steel via a joint made of the material different from stainless steel, and the thin tube may be used as a refrigerant charge port.

Moreover, in the above-described embodiments, the air conditioner of a separate type or a separation type in which the indoor unit and the outdoor unit are provided as separate units has been exemplified. However, the air conditioner which is the refrigeration apparatus of the present disclosure is not limited thereto. An air conditioner of a type in which a compressor, a condenser, an evaporator, a fan, and the like, which are components of the air conditioner, are integrated and housed in one casing is also included in the refrigeration apparatus of the present disclosure.

Further, in the above-described embodiments, the accumulator is provided on the suction side of the compressor, but the air conditioner may not include such an accumulator.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST

1: INDOOR UNIT
2: OUTDOOR UNIT
2a: CASING
3: REFRIGERANT CIRCUIT
4: COMPRESSOR
4a: SUCTION PORTION
4b: DISCHARGE PORTION
5: INDOOR HEAT EXCHANGER
6: ELECTRONIC EXPANSION VALVE
7: OUTDOOR HEAT EXCHANGER
8: REFRIGERANT PIPE
9: INDOOR FAN
10: OUTDOOR FAN
11: ACCUMULATOR
12: OIL SEPARATOR
13: VALVE
14: OIL RETURN PIPE
15: MUFFLER
16: FOUR-WAY SWITCHING VALVE
17: GAS SHUTOFF VALVE
18: LIQUID SHUTOFF VALVE
21: PIPE
22: PIPE
23: PIPE
24: PIPE
31: FIRST PORT
32: SECOND PORT
33: THIRD PORT
34: FOURTH PORT
36: HOLE
40: JOINT
40a: FIRST LARGE-DIAMETER PORTION
40b: FIRST SMALL-DIAMETER PORTION
40c: FIRST INCLINED PORTION
41: THIN TUBE
50: PIPE MAIN BODY
50a: SECOND LARGE-DIAMETER PORTION
50b: SECOND SMALL-DIAMETER PORTION
50c: SECOND INCLINED PORTION
51: COPPER PIPE
60: PIPE
61: JOINT
62: PIPE MAIN BODY
62a: SECOND LARGE-DIAMETER PORTION
62b: SECOND SMALL-DIAMETER PORTION
62c: SECOND INCLINED PORTION
63: COPPER PIPE
64: BEAD
65: HOLE
66: BEAD
70: PIPE
71: JOINT
71a: FIRST LARGE-DIAMETER PORTION
71b: FIRST SMALL-DIAMETER PORTION
71c: FIRST INCLINED PORTION
72: PIPE MAIN BODY
72a: SECOND LARGE-DIAMETER PORTION
72b: SECOND SMALL-DIAMETER PORTION
72c: SECOND INCLINED PORTION
73: COPPER PIPE
74: ENLARGED DIAMETER PORTION
75: HOLE
80: JOINT
81: RIB
82: SECOND PIPE
83: ENLARGED DIAMETER PORTION
90: COPPER PLATING LAYER
A: AIR CONDITIONER (REFRIGERATION APPARATUS)
B: AIR CONDITIONER (REFRIGERATION APPARATUS)
C: SWITCHING MECHANISM
P: FLOW PATH (OF REFRIGERANT)
R1: REFRIGERANT PIPE
R2: REFRIGERANT PIPE
R3: REFRIGERANT PIPE
R4: REFRIGERANT PIPE

What is claimed is:

1. A refrigerant pipe of a refrigeration apparatus, the refrigerant pipe comprising:
   a first pipe, made of stainless steel, through which a refrigerant flows;
   a joint pipe, made of copper or copper alloy, disposed on an outer peripheral surface of the first pipe, and that comprises:
      a small-diameter portion;
      a large-diameter portion having a pipe diameter greater than that of the small-diameter portion; and
      an inclined portion connecting the large-diameter portion to the small-diameter portion; and
   a second pipe, having a diameter smaller than a diameter of the first pipe, connected to the outer peripheral surface of the first pipe via the joint pipe, wherein
   the small-diameter portion of the joint pipe is inserted into an opening of the first pipe,
   the second pipe is inserted into the large-diameter portion of the joint pipe,
   a surface of the second pipe at which the second pipe is connected to the joint pipe is made of a material identical to the material of the joint pipe,
   the inclined portion of the joint pipe has:
      an outer peripheral surface that constitutes a first positioning mechanism:
         at which the joint pipe contacts an edge of the opening of the first pipe, and
         that sets a position of the joint pipe with respect to the first pipe; and
      an inner peripheral surface that constitutes a second positioning mechanism:
         at which the joint pipe contacts the second pipe, and
         that sets a position of the second pipe with respect to the joint pipe, and
   the first pipe is a refrigerant pipe that causes a refrigerant to flow between a plurality of components constituting a refrigerant circuit.

2. The refrigerant pipe of the refrigeration apparatus according to claim 1, wherein the joint pipe is disposed with respect to the first pipe in a direction orthogonal to a pipe axis direction of the first pipe.

3. The refrigerant pipe of the refrigeration apparatus according to claim 1, wherein the second pipe comprises:
   a pipe main body made of stainless steel; and
   a connecting portion at an end of the pipe main body, and the surface is disposed in the connecting portion.

4. The refrigerant pipe of the refrigeration apparatus according to claim 3, wherein the pipe main body comprises:
   a large-diameter portion; and
   a small-diameter portion having a diameter smaller than a diameter of the large-diameter portion, and the connecting portion of the second pipe is disposed on an outer peripheral surface of the small-diameter portion.

5. The refrigerant pipe of the refrigeration apparatus according to claim 3, wherein the pipe main body of the second pipe overlaps the first pipe in a pipe radial direction of the second pipe.

6. The refrigerant pipe of the refrigeration apparatus according to claim 1, wherein the second pipe is made of copper.

7. The refrigerant pipe of the refrigeration apparatus according to claim 1, wherein the second pipe overlaps the first pipe in a pipe radial direction of the second pipe.

8. A refrigeration apparatus, comprising
   a refrigerant circuit comprising:
      components; and
      a refrigerant pipe connecting the components, wherein
   the refrigerant pipe comprises the refrigerant pipe according to claim 1.

\* \* \* \* \*